Sept. 17, 1957  G. W. DEMUTH ET AL  2,806,401
CONTAINER INSPECTION
Filed Feb. 17, 1954  2 Sheets-Sheet 1
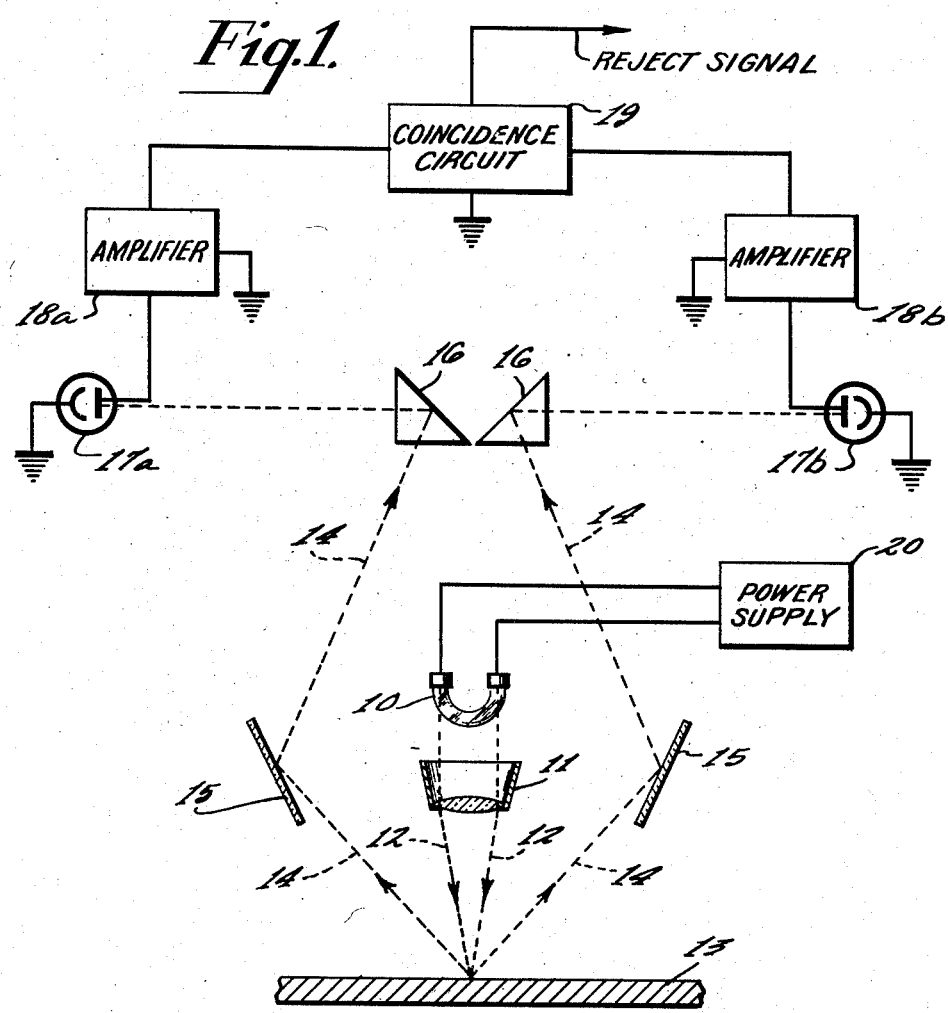
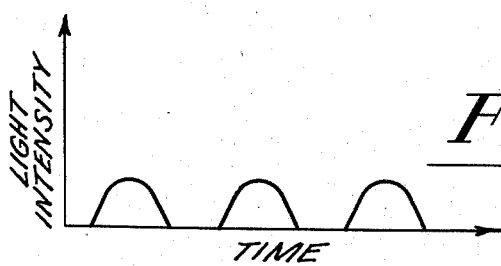
INVENTORS
Galan W. Demuth &
Paul Weathers
BY Morris A. Rabkin
ATTORNEY Sept. 17, 1957 G. W. DEMUTH ET AL 2,806,401
CONTAINER INSPECTION
Filed Feb. 17, 1954 2 Sheets-Sheet 2

INVENTORS
Galan W. Demuth &
Paul Weathers
BY Morris A. Rabkin
ATTORNEY

United States Patent Office 2,806,401
Patented Sept. 17, 1957

2,806,401

CONTAINER INSPECTION

Galan W. Demuth, Moorestown, and Paul Weathers, Haddon Heights, N. J., assignors to Radio Corporation of America, a corporation of Delaware Application February 17, 1954, Serial No. 410,951

2 Claims. (Cl. 88—14)

This invention relates to container inspection, and, more particularly, to a novel method of and means for inspecting the surface of empty glass, vitreous or other glossy surfaced containers. Inspection is accomplished by a modulated radiant energy beam, such as a light beam, focused on the surface to be inspected and energy diffusely reflected from the surface is picked up to indicate the presence of foreign matter.

An inspection system in successful use for detecting the presence of foreign matter and other contamination on the inside surfaces of empty bottles is disclosed by Arthur D. Beard in his pending application for a U. S. patent, Serial No. 251,089, filed October 12, 1951, now Patent Number 2,730,922, issued January 17, 1956. That application discloses a means for projecting a radiant beam on a surface, and a coincidence system for detecting increases in diffusely reflected radiant energy. The coincidence system comprises a pair of mirrors suitably spaced for picking up only the diffuse reflections simultaneously. In this manner any reflections that are reflected specularly by clean surfaces will strike only one mirror at a time. The pick-up mirrors reflect the diffuse energy to a pair of photocells. Output electrical signals corresponding to the quantity and intensity of diffuse light are generated. The outputs of the photocells are coupled to a coincidence circuit that is biased to respond only to simultaneous increases in output from the photocells. The coincidence circuit output is a reject signal. The application also describes mechanisms for rotating and moving the container relative to the radiant energy beam so that the entire inner surface will be scanned.

In the system disclosed by Beard, an ultra-violet radiation source in the form of a mercury-vapor lamp operated by a filtered direct current power supply is used to produce a smooth, unmodulated radiant energy beam.

The inspection system of the present invention employs a violet radiation modulated at a high frequency as compared with power line frequencies and a coincidence system that is designed to respond to the signals produced by the modulated radiation.

For the sake of convenience of description, the term "light" will be used to embrace ultra-violet radiation.

In brief, a high frequency power supply energizes a lamp to provide a modulated beam of light. This beam is focused on the inner surface of a container to be inspected. A pair of mirrors is arranged to pick-up the diffusely reflected light and direct it to a pair of photocells. The electrical output signal from the photocells is now a modulated signal having an intensity varying in accordance with the modulation of the diffusely reflected light beam. This signal is amplified by an amplifier having a frequency response that is restricted to be near or about the modulation frequency of the light. The signals are then coupled to the coincidence circuit, the output of which is a reject signal when intensity of the signals produced by the diffusely reflected light is above a predetermined level.

An object of this invention is to provide an improved method for the inspection of surfaces.

Another object of this invention is to provide an improved method for photoelectric inspection of surfaces for the presence of foreign matter using light diffusely reflected from the surface.

A further object of the invention is to provide a method of inspection for foreign matter and contamination on surfaces regardless of the form or type of contamination.

Still another object of this invention is to provide a photoelectric method of inspecting for foreign matter and contamination on surfaces that is relatively insensitive to stray and ambient illumination.

A still further object of this invention is to provide a photoelectric method of inspecting for foreign matter and contamination on the inside surfaces of empty containers that is independent of scanning speed.

A still further object of this invention is to provide novel apparatus for the inspection of surfaces.

A still further object of this invention is to provide an improved apparatus for photoelectric inspection of surfaces that is responsive to contaminated areas regardless of extent or nature of the contamination thereon.

A still further object of this invention is to provide an apparatus for photoelectrically inspecting surfaces that is relatively independent of scanning speed.

A still further object of this invention is to provide an apparatus for the photoelectric inspection of surfaces that is relatively insensitive to stray or ambient light.

A still further object of this invention is to provide an apparatus for the photoelectric inspection of surfaces using a mercury-vapor lamp that increases the useful life of the lamp.

Other objects and advantages of the present invention will, of course, become apparent and immediately suggest themselves to those skilled in the art to which the invention is directed from a reading of the following specification in connection with the accompanying drawing, in which:

Figure 1 is a somewhat pictorial schematic view of the optical and circuit elements of an illustrative embodiment of this invention;

Figure 2 is a graph of the light intensity of the mercury vapor lamp of Figure 1 plotted against time;

Figure 3:
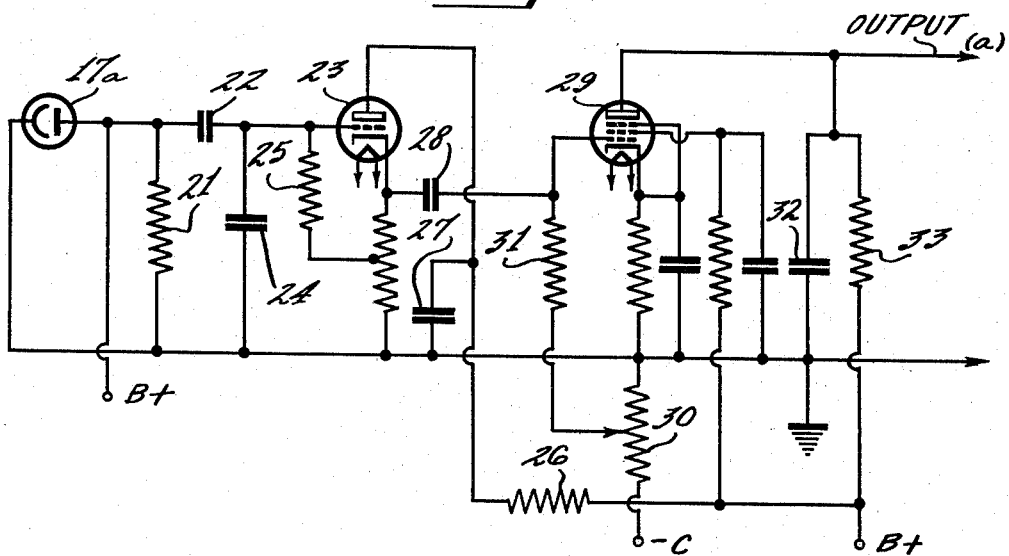
Figure 3 is a schematic circuit diagram of an amplifier useful in this embodiment of the invention.

In Figure 1 a mercury-vapor lamp 10 is located near the lens system. A beam of light 12 is focused on the surface 13 to be inspected, and diffusely reflected as light rays 14. Mirrors 15 are oriented to pick-up the diffusely reflected light rays 14 and direct them into a pair of reflecting prisms 16. The light so reflected impinges upon the active elements in photomultiplier tubes 17a and 17b, which convert the light into electrical signals that are amplified by amplifiers 18a and 18b to be described in detail later. These amplified signals are fed into the inputs of a coincidence circuit 19 to be later described which is biased to pass current and indicate a reject signal only when excited by simultaneous signals from the amplifiers 18a and 18b. The photomultiplier tubes may be of any well-known type.

The light output of the mercury vapor lamp 10 is modulated as shown by the graph of Figure 2. This modulation is accomplished by powering the lamp 10 with a high frequency power supply 20. The power supply is of a well known design and contains a typical oscillator, buffer amplifiers and a final push-pull stage. As is normally the practice, it is, or may be transformer coupled by a transformer (not shown) to the mercury-vapor lamp 10. To obtain a greater benefit from the entire apparatus, the modulation should be at a higher frequency than power line frequencies. A practical frequency for the high frequency power supply is 500 cycles per second. Since power is transmitted to the lamp on the negative and positive cycles of the high frequency wave, the light intensity as shown in Figure 2 varies at twice the power supply frequency. In this case the light would pulse at 1,000 cycles per second or be 100 percent modulated at this rate.

When the modulated light strikes any contamination on the surface 13, a ray of modulated diffuse light is picked up by the mirrors 15 and sent to the photomultiplier tubes 17a and 17b. Therefore, a varying electrical signal results which may be amplified. Without modulated light some discontinuity must occur in the contamination to provide a varying signal that the amplifiers 18a and 18b can amplify. The surface 13 must, therefore, move relative to the light beam and there must be discontinuities in the contamination if the light is unmodulated in accordance with prior practices. Modulation of the light in this apparatus permits inspection for contamination without the necessity of motion or discontinuities in contamination. Although the surface is moved so that an entire area can be inspected, inspection can begin before any motion occurs and uniformly distributed contamination can be detected.

Referring to Figure 3, the modulated signal output of the photomultiplier tubes 17a (only one branch of the circuit is shown) is fed to the input of an amplifier disclosed herein. Voltage for the photomultiplier tube is provided by a separate B+ source (not shown). A resistor 21 shunts the input, and the signal voltage is developed across it. The coupling capacitor 22 is connected to the input of a typical cathode follower stage 23. However, a capacitor 24 shunts the input to the stage. Together with the grid resistor, this arrangement of capacitors and resistors is a filter network for the purpose of restricting the amplifier response to the frequency in the operating region of the pulsating signal; thus, eliminating false signals picked up from lamps pulsed by power line frequencies, or other stray light. In this embodiment, that frequency would be 1,000 cycles per second. The attenuation of low frequencies to meet the required response characteristics is controlled by varying the proportionate values of the coupling capacitor 22 with respect to the corresponding values of the grid resistor 25. In accordance with well established engineering rules, decreasing the time constant of the circuit made up by the grid resistor 24 and the coupling capacitor 22 will attenuate low frequencies. The attenuation of high frequencies to meet the high frequency restrictions is produced by shunt capacitor 24. Increasing the capacitance of this element will shunt the high frequency components in the signal to the common ground. The cathode follower stage 23 receives anode voltage from a common B+ supply (not shown) through a decoupling network composed of a resistor 26 and a capacitor 27. The filter network may be arranged to have a peaked response at the frequency of light pulsations as mentioned or in another workable although not preferred embodiment, a high pass response may be provided which will achieve the major objective of the filter circuit which is to eliminate false signals from ambient light sources pulsed at power line frequencies.

The output of the cathode follower passes through a coupling capacitor 28 to the grid of a pentode amplifier stage 29. Again this stage is designed according to known engineering standards. A negative constant grid bias is provided through grid resistor 31 from a source of negative bias (not shown) and the proper bias is tapped off a potentiometer 30 connected from that source to the common ground. The pentode circuit may also act as a filter circuit by decreasing the time constant of the grid circuit made up by coupling capacitor 28 and grid resistor 31 thereby attenuating the low frequency signals. Increasing the capacity of shunt capacitor 32 removes the higher frequency signals. The pentodes' anode voltage is taken from the common B+ supply across plate resistor 33.

Figure 4:
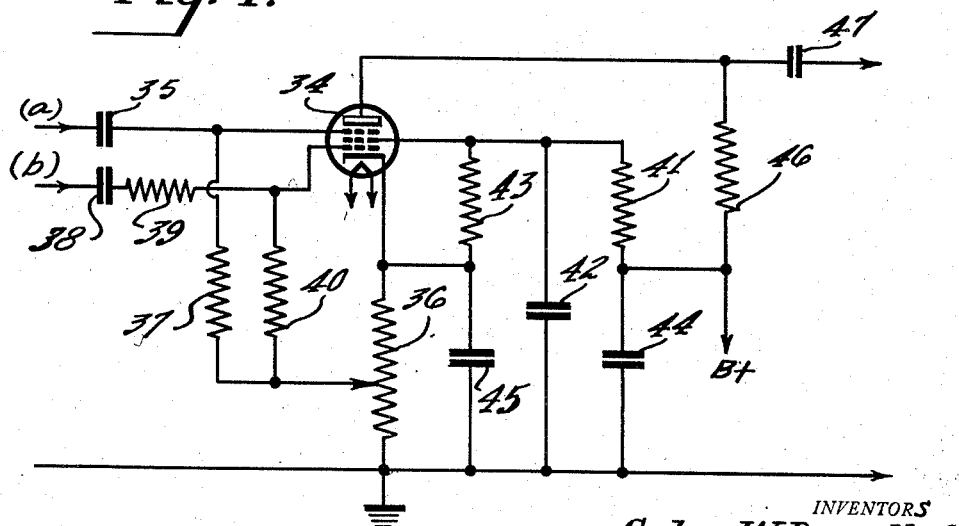
Figure 4 is a schematic diagram of a coincidence circuit useful in the embodiment of Figure 1.

In Figure 4, the amplifier outputs from each side of the circuit of Figure 1 are coupled to the control grid and the suppressor grid of a pentode 34. These signals act to gate the pentode so that it can conduct only when both signals appear at the grids simultaneously.

One amplifier output is connected through coupling capacitor 35 to the pentode suppressor grid. Suppressor grid bias coming from a tap on the cathode resistor 36 is brought to the suppressor through a grid resistor 37.

The control grid receives its signal from the other amplifier through coupling capacitor 38 and a voltage divider formed by two grid resistors 39 and 40. Grid resistor 40 is connected to the tap on the cathode resistor 36 to provide grid bias. The time constant of the grid circuits can be adjusted to attenuate low frequencies as described before.

The screen grid voltage is derived from the B+ source through a dropping resistor 41. Screen bypass capacitor 42 shunts the alternating components of the screen voltage to the common ground. This capacitor together with resistor 43 and B+ decoupling capacitor 44, tends to keep the screen voltage constant. A cathode bypass capacitor 45 provides direct current grid bias. Anode voltage is coupled through the plate resistor 47 from the common B+ supply.

Plate current flows only when both inputs receive signals simultaneously. Then a reject signal is coupled to any suitable output means through capacitor 47 to indicate surface contamination. In case bottles are being inspected for cleanliness, this reject signal can be used in any desired manner (not shown) to warn the operator of the machine, or energize other circuits and apparatus that will remove the bottle automatically and rewash it.

What is claimed is:

1. In apparatus for inspection of a surface for the presence of foreign matter lying thereupon, the combination comprising means including a lamp for directing a beam of light upon said surface to be reflected therefrom in diffuse and specular reflection paths, a source of alternating electric current having a frequency higher than conventional power line frequencies operatively energizing said lamp thereby modulating said light beam, scanning apparatus containing said light beam directing means and a plurality of means for simultaneously picking-up said diffusely reflected light, separate photoelectric means for converting said diffusely reflected light into electrical signals of an intensity varying in accordance with the modulation of said diffusely reflected beam, means to amplify each of said electrical signals, and an electronic coincidence circuit actuated by said electrical signals and biased to cut-off except on the simultaneous occurrence of at least two of said signals thereby responding only when at least two of said diffused reflections are picked-up simultaneously.

2. In an apparatus according to claim 1, an electrical filter network included in said amplifying means having a frequency response limited to the frequency band of said electrical signals.

References Cited in the file of this patent

UNITED STATES PATENTS

| 1,965,373 | Fitz Gerald | July 3, 1934 |
| 2,060,957 | Tarvin et al. | Nov. 17, 1936 |
| 2,132,254 | Becker | Oct. 4, 1938 |
| 2,165,054 | Johnson | July 4, 1939 |
| 2,586,746 | Tyler | Feb. 19, 1952 |